Dec. 6, 1960
D. E. PATTERSON
2,963,563
FLOW ACTUATED SIGNALLING DEVICE FOR
LOW AND/OR INTERMITTENT FLOW RATES
Filed May 22, 1958
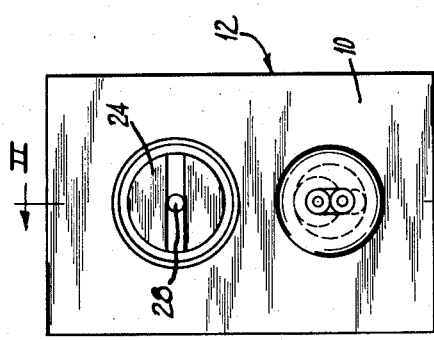
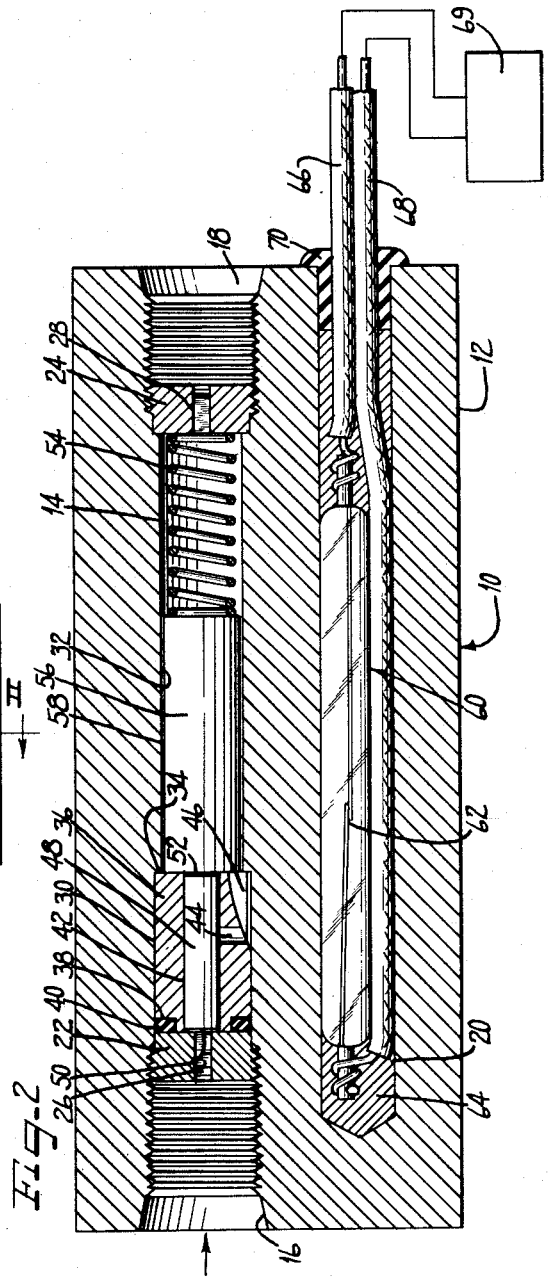
Inventor
Donald E. Patterson
by Hill, Sherman, Meroni, Gross & Simpson
Attys

United States Patent Office 2,963,563
Patented Dec. 6, 1960

2,963,563

FLOW ACTUATED SIGNALLING DEVICE FOR LOW AND/OR INTERMITTENT FLOW RATES

Donald E. Patterson, Buffalo, N.Y., assignor to Houdaille Industries, Inc., Buffalo, N.Y., a corporation of Michigan Filed May 22, 1958, Ser. No. 737,144

10 Claims. (Cl. 200—81.9)

This invention relates to a flow actuated indicator, and more particularly to a flow indicator which is responsive to low and-or intermittent flow to actuate a device in an electrical or electronic circuit such as an indicating lamp, a horn, relays to ring phones, shut off motors, or the like.

Signalling devices which are currently available for use in detecting fluid flow are generally insufficiently sensitive to low and/or intermittent flow rates and pressures and are subject to influence from variations in internal pressure. The present invention provides an indicator which is responsive to such flow rates and pressures regard'ess of the internal pressure in the device and is effective to operate signal means electrically at a desired location relative to the device. In accordance with the invention, a plunger bushing is held in stat'onary position in a body element which defines an axial bore therethrough, and a plunger is received in the plunger bushing in slidable relationship thereto. A cylindrical magnet is slidably received in the axial bore of the body member and is urged against one end of the p'unger by spring means suitably mounted in the bore so that the other end of the plunger normally bears against a plug disposed in abutting relation to the plunger bushing. The plug defines an opening or orifice which is in communication with an inlet end of the axial bore and is adapted to introduce fluid against the said other end of the plunger so that the plunger may be readily moved in the plunger bushing in the direction of the outlet end of the bore. The plunger bushing defines a passage which opens to the interior of the bushing at a predetermined distance from the ends thereof, and this passage communicates with a passage or exterior channel extending axially in the bushing to the end thereof adjacent the outlet portion of the bore. Accordingly, when the plunger has been depressed to an extent sufficient to afford communication between the inlet portion of the bore and the passage in the bushing, fluid will be permitted to flow around the cylindrical magnet to the outlet portion of the bore, the magnet having a diameter which is smaller than the diameter of the bore receiving it for this purpose. This movement of the plunger is effective to move the magnet a corresponding distance in the same direction, and a suitable electrical component is disposed in the body member in predetermined spaced relation to the magnet so as to actuate the electrical component in response to the movement of the magnet, and transmit a signal through suitable leads to a signal element such as a lamp, horn, phone, motor shut-off means or the like. Cessation of flow permits the spring means to return the magnet and plunger to the initial no flow position thereof, and, if further flow does not occur before the initial position is reached, the switch will thereupon be opened or closed to operate a signal, depending upon whether the switch is normally opened or normally closed.

Accordingly, it is an object of the present invention to provide a flow actuated indicator which is sensitive to low and/or intermittent flow regardless of the internal pressure therein and which is adapted to actuate a signal device in an electrical or electronic circuit such as a lamp or horn, relays to ring phones or shut-off motors, and the like.

Another object of the invention is to provide a flow actuated indicator as described in which a flow responsive plunger is slidably received in a plunger bushing and a magnet is slidably disposed in abutting relation to the plunger so as to transmit predetermined force from spring means to the plunger to urge the plunger to a no-flow indicating position, the magnet being adapted to make or break a switching means when the plunger is urged by the fluid flow thereagainst to a flow indicating position.

Yet another object of the invention is to provide a signal indicator as described which is of simple and economical construction and is formed with an axial bore in the signal body member so that a minimum number of machining operations are required, the bore serving as the flow channel for fluids passing through the indicator and receiving the plunger bushing, magnet and spring means therein.

Another object of the invention is to provide a signal indicator as described wherein the magnet has a diameter slightly less than the diameter of the bore so as to permit ready flow of fluids therearound to an outlet end of the bore when the plunger has been depressed by fluid pressure thereagainst.

Other objects and advantages of the invention will become apparent as the description proceeds in accordance with the drawings in which:

Figure 1 is an end view of a fluid flow indicator according to the present invention; and Figure 2 is a vertical sectional view of the structure show in Figure 1 taken through the lines 2—2.

Referring now to Figures 1 and 2, a flow actuator indicator 10 is shown according to the present invention comprising a body member 12 which defines therethrough an axial bore 14 having an inlet end 16 and an outlet end 18. A second bore 20 is formed in preferably parallel re'ationship to the bore 14 extending from the outlet end of the body member 12 to a point adjacent the inlet end of the body member 10 as hereinafter further described. In one application of the invention, the inlet end 16 and the outlet end 18 of the bore 14 may be connected in a piping system as close to the terminal point of the system as possible, the direction of flow being indicated by the arrow in Figure 2. A pair of plugs 22 and 24 are threadedly received in the inlet and outlet portions 16 and 18 respectively of the bore 14, the plugs 22 and 24 being adapted to permit fluid flow therethrough by means of openings or orifices 26 and 28 defined therein which are preferably provided by means of diametrical channels having a central bore of predetermined dimensions at the interior portion thereof. The portion of the bore 14 between the plugs 22 and 24 includes a relatively wide portion 30 and a somewhat narrower elongated portion 32, a shoulder 34 being defined therebetween against which a plunger bushing 36 of substantially cylindrical configuration is adapted to seat as held in position by the plug 22. The lower end of the plunger bushing 36 defines an annular recess 38 for receiving a gasket 40 in sealing relationship with the p'ug 22, and a central bore 42 is defined coaxially therethrough which is adapted to be placed in communication with the portion 32 of the bore 14 by means of a cross-port or passage 44 between the bore 42 and a channel or external passage 46 defined in the plunger bushing. The cross port 44 is spaced a predetermined distance from the upper end of the plunger bushing 36 adjacent the inlet portion of the bore 14 as hereinafter further described, and the channel 46 is preferably deepened inwardly and downwardly to afford a desired flow area around the shoulder 34 and into the bore portion 32.

In order to afford a signal indication of fluid flow in the indicator 10, a plunger 48 is slidably received in the bore 42, the axial dimensions of the plunger preferably substantially corresponding to the dimensions of the plunger bushing 36 so that when it is positioned as shown with its lower end 50 in abutting relationship with the plug 22 its upper end 52 coincides with the upper end of the plunger bushing. It will be understood, however, that other configurations and dimensions also fall within the scope of the invention.

The plunger 48 is biased into the abutting relationship with the plug 22 by means of a spring 54 which bears at its upper end against the plug 24 and is adapted to transmit pressure or force to the plunger through a cylindrical magnet 56. The magnet 56 has a diameter which is less than the diameter of the portion 32 of the bore 14 by a predetermined extent and is movable axially within the bore portion 32 so as to respond immediately and sensitively to movement of the plunger 48. The spring 54 is adapted to permit inward movement of the plunger 48 in response to low or intermittent fluid flow introduced against the end 50 of the plunger through the inlet 16 and the orifice 26. When this movement is sufficient to afford communication between the inlet portion 16 and the passage 44, the fluid will be transmitted through the passage 44 into the channel 46 in the plunger bushing 36 and thence into the portion 32 of the bore 14, it being appreciated that the plunger's inward movement will also serve to effect an identical extent of axial movement in the magnet 56. The reduced diameter of the magnet 56 relative to the bore 32 provides a passage 58 around the magnet whose flow area is sufficient to afford unimpeded flow to the portion of the bore 32 adjacent the plug 24. Thereupon, the fluid passes through the opening 28 in the plug 24 and the outlet 18 of the bore 14 to the terminal portion of the pipe system which is, as hereinbefore stated, preferably in proximate relationship to the terminus of the system.

The axial movement of the magnet 56 in response to the inward movement of the plunger 48 is effective to actuate an electrical component 60 suitably mounted within the bore 20 in accordance with the understanding of those skilled in the art. This electrical component 60 may be of any suitable type which is responsive to the axial movement of the magnet 56 effected during movement of the plunger 48 in opening the passage 44, and likewise, the spacing of the port 44 from the upper end of the plunger bushing 36 is calibrated in accordance with the characteristics of the component 60. In one form of the invention, the component 60 comprises an hermetically sealed, magnetically actuated switch 62 positioned in the bore 20 by means of a potting compound 64. The leads 66 and 68 for the switch 62 extend through the open end of the bore 20 into connection with a suitable electrical or electronic circuit for energizing a suitable signal 69 as hereinbefore described, the leads being secured in the open end of the bore 20 by means of a grommet 70. Other suitable components, however, may be utilized within the scope of the invention as will be readily understood by those skilled in the art.

There has thus been provided a flow indicator wherein the operation of a plunger is accurately calibrated to respond to low or intermittent flow regardless of the nature of internal pressures in the body of the indicator, and without interruption from breakdown or wear. The fact that the magnet is dimensioned so that its external diameter is less, to a desired extent, than the diameter of the bore in which it is slidably received reduces friction in the system and maintains a quick and sensitive response in the indicator since fluid flow around the magnet after the plunger has been depressed to flow position lubricates and assists the magnet in its travel, and the axial alignment of parts affords freedom from pressure distortion and a considerable simplicity in manufacture.

Although I have herein set forth and described my invention with respect to certain specific principles and details thereof, it will be obvious to those skilled in the art that these may be varied without departing from the spirit and scope of the invention as set forth in the hereunto appended claims.

I claim as my invention:

1. A fluid flow indicator comprising a body defining a flow passage therethrough, a plunger bushing disposed in stationary relationship in said passage, a plunger slidably received in said plunger bushing, a magnet slidably received in said passage in abutting relationship with one end of said plunger, the cross-sectional area of said magnet being less than the cross-sectional area of the passage receiving it by a predetermined extent whereby to afford flow therearound, spring means urging said magnet and said plunger toward an inlet end of said passage and means adjacent the inlet end of said passage for maintaining said plunger in initial position within said plunger bushing, said means including an orifice defined thereby opening into communication with the end of said plunger adjacent thereto, said plunger bushing defining a conduit means leading from the portion thereof receiving said plunger to the portion of said passage receiving said magnet and to an outlet end of said passage.

2. A fluid flow indicator comprising a body defining a bore therethrough having an inlet and an outlet, a plunger, means in said body slidably receiving said plunger and defining a passage in predetermined spaced relationship to the inlet end of said bore, said passage being adapted to communicate with the inlet portion of said bore and the outlet portion of said bore when said plunger is moved by fluid flow toward the outlet a predetermined extent, a magnet slidably received in said bore, spring means urging said magnet into abutting relationship with the end of said plunger adjacent the outlet of said bore and urging said plunger into closing relationship with said passage, and switch means adapted to be actuated by said magnet when said passage is in communication with the inlet portion of said bore and the outlet portion of said bore.

3. A fluid flow indicator comprising a body defining a bore therethrough having an inlet and an outlet, a plunger, means in said body slidably receiving said plunger and defining a passage in predeterminated spaced relationship to the inlet end of said bore, said passage being adapted to communicate with the inlet portion of said bore and the outlet portion of said bore when said plunger is moved by fluid flow toward the outlet a predetermined extent, a magnet slidably received in said bore, said magnet having a diameter less than the diameter of the portion of said bore and urging said plunger into position to close said passage receiving it by a predetermined extent, spring means urging said magnet into abutting relationship with the end of said plunger adjacent the outlet of said bore, and switch means adapted to be actuated by said magnet when said passage is in communication with the inlet portion of said bore and the outlet portion of said bore.

4. A fluid flow indicator comprising a body defining a bore therethrough having an inlet end and an outlet end, a plunger bushing defining a bore therethrough, said body defining a shoulder, plug means threadedly engaged in said bore in said body and defining an orifice therethrough, said plug means maintaining said plunger bushing in stationary position against said shoulder, a plunger slidably received in said plunger bushing bore, a magnet slidably received in said bore in said body, spring means urging said magnet into abutting engagement with the end of said plunger adjacent said outlet end, said plug means being adapted to retain said plunger in said plunger bushing against said spring means, and switch means adapted to be actuated when said magnet is moved a predetermined distance toward the inlet end of said bore in said body, said plunger bushing and said body defining passage means opening into the bore in said plunger bushing a predetermined distance from the end of said plunger bushing adjacent the inlet end of said bore in said body such that when the end of said plunger adjacent the inlet end of said bore in said body is moved toward the outlet end of said bore in said body a distance sufficient to open said passage in said plunger bushing to the inlet end of said bore in said body, said magnet will actuate said switch means, said passage means being adapted to communicate with the outlet end of said bore in said body.

5. A fluid flow indicator comprising a body defining a bore therethrough having an inlet end and an outlet end, a plunger bushing defining a bore therethrough, said body defining a shoulder, plug means threadedly engaged in said bore in said body and defining an orifice therethrough, said plug means maintaining said plunger bushing in stationary position against said shoulder, a plunger slidably received in said plunger bushing bore, a magnet slidably received in said bore in said body, said magnet having a diameter less than the diameter of said bore in said body receiving it by an extent sufficient to afford substantially unimpeded fluid flow therearound, spring means urging said magnet into abutting engagement with the end of said plunger adjacent said outlet end, said plug means being adapted to retain said plunger in said plunger bushing against said spring means, and switch means adapted to be actuated when said magnet is moved a predetermined distance toward the inlet end of said bore in said body, said plunger bushing and said body defining passage means opening into the bore in said plunger bushing a predetermined distance from the end of said plunger bushing adjacent the inlet end of said bore in said body such that when the end of said plunger adjacent the inlet end of said bore in said body is moved toward the outlet end of said bore in said body a distance sufficient to open said passage in said plunger bushing to the inlet end of said bore in said body, said magnet will actuate said switch means, said passage means being adapted to communicate with the outlet end of said bore in said body.

6. A fluid flow indicator adapted to provide a signal in an electrical or electronic signal means comprising a body, a magnet slidably received in said body, a plunger, means slidably receiving said plunger and secured in said body, an inlet in said body leading to an end of said plunger, an outlet in said body, said means defining a passage adapted to communicate with said inlet and said outlet when said plunger is moved toward said outlet a predetermined distance, spring means urging said magnet into abutting relation with the end of said plunger adjacent said outlet and urging said plunger into closing relationship with said passage, means adapted to retain said plunger in a predetermined initial position in said means slidably receiving said plunger and switch means adapted to be actuated by said magnet when said inlet is in fluid communication with said outlet.

7. A flow actuated signalling device for low and intermittent flow rates comprising a body member defining an axial bore therethrough, a pair of plugs threadedly engaged in said bore in predetermined spaced relationship, each of said plugs defining an orifice therein, a plunger bushing disposed between said plugs in abutting relationship to one of said plugs, said plunger bushing defining an axial bore therethrough, a passage extending from said axial bore in said plunger bushing in predetermined spaced relationship to the end of said plunger bushing to the exterior of said plunger bushing, said plunger bushing defining a channel extending from said passage to the end of said plunger bushing away from said plug, said axial bore in said body member defining a shoulder cooperating with said one of said plugs positioning said plunger bushing in said axial bore in said body member, a plunger slidably received in said plunger bushing having an axial dimension corresponding to the axial dimension of said axial bore in said plunger bushing, said one plug providing a stop means for said plunger and being adapted to introduce fluid against the end adjacent thereto, a cylindrical magnet slidably received in said axial bore in said body member between said plunger and said other plug, spring means bearing at one end on said other plug and at the other end against said cylindrical magnet, whereby to urge said magnet into abutting relationship with the other end of said plunger and to urge said plunger into abutting relationship with said one plug, and switch means responsive to axial movement of said magnet toward said other plug for a distance corresponding to the distance between said passage and said one plug.

8. A flow actuated signalling device for low and intermittent flow rates comprising a body member defining an axial bore therethrough, a pair of plugs threadedly engaged in said bore in predetermined spaced relationship, each of said plugs defining an orifice therein, a plunger bushing disposed between said plugs in abutting relationship to one of said plugs, said plunger bushing defining an axial bore therethrough, a passage extending from said axial bore in said plunger bushing in predetermined spaced relationship to the end of said plunger bushing to the exterior of said plunger bushing, said plunger bushing defining a channel extending from said passage to the end of said plunger bushing away from said plug, said axial bore in said body member defining a shoulder cooperating with said one of said plugs positioning said plunger bushing in said axial bore in said body member, a plunger slidably received in said plunger bushing having an axial dimension corresponding to the axial dimension of said axial bore in said plunger bushing, said one plug providing a stop means for said plunger and being adapted to introduce fluid against the end adjacent thereto, a cylindrical magnet slidably received in said axial bore in said body member between said plunger and said other plug, spring means bearing at one end on said other plug and at the other end against said cylindrical magnet, whereby to urge said magnet into abutting relationship with the other end of said plunger and to urge said plunger into abutting relationship with said one plug, a bore extending axially in said body member from the end thereof adjacent said other plug to a point adjacent said one plug in substantially parallel relationship to said first axial bore in said body member, and switch means in said second axial bore in said body member responsive to axial movement of said magnet toward said other plug for a distance corresponding to the distance between said passage and said one plug.

9. A flow actuated signalling device for low and intermittent flow rates comprising a body member defining an axial bore therethrough, a pair of plugs threadedly engaged in said bore in predetermined spaced relationship, each of said plugs defining an orifice therein, a plunger bushing disposed between said plugs in abutting relationship to one of said plugs, said plunger bushing defining an axial bore therethrough, a passage extending from said axial bore in said plunger bushing in predetermined spaced relationship to the end of said plunger bushing to the exterior of said plunger bushing, said plunger bushing defining a channel extending from said passage to the end of said plunger bushing away from said plug, said axial bore in said body member defining a shoulder cooperating with said one of said plugs positioning said plunger bushing in said axial bore in said body member, a plunger slidably received in said plunger bushing having an axial dimension corresponding to the axial dimension of said axial bore in said plunger bushing, said one plug providing a stop means for said plunger and being adapted to introduce fluid against the end adjacent thereto, a cylindrical magnet slidably received in said axial bore in said body member between said plunger and said other plug, said cylindrical magnet having a diameter less than the portion of the bore receiving it to a predetermined extent and defining an annular passage communicating with the portion of said bore between said cylindrical magnet and said other plug, spring means bearing at one end on said other plug and at the other end against said cylindrical magnet, whereby to urge said magnet into abutting relationship with the other end of said plunger and to urge said plunger into abutting relationship with said one plug and switch means responsive to axial movement of said magnet toward said other plug for a distance corresponding to the distance between said passage and said one plug.

10. A fluid flow indicator adapted to provide a signal in an electrical or electronic signal means comprising a body, a magnet slidably received in said body, a plunger, means slidably receiving said plunger and secured in said body, an inlet in said body leading to one end of said plunger, an outlet in said body, said means defining a passage adapted to communicate with said inlet and said outlet when said plunger is moved toward said outlet a predetermined distance, spring means urging said magnet into abutting relation with the end of said plunger adjacent said outlet and urging said plunger into closing relationship with said passage, means adapted to retain said plunger in a predetermined initial position in said means slidably receiving said plunger and switch means adapted to be actuated by said magnet when said inlet is in fluid communication with said outlet, said spring means affording movement of said plunger and said magnet sufficient to open said passage in response to low and intermittent flow rates introduced against said plunger.

References Cited in the file of this patent

UNITED STATES PATENTS

| | | |
|---|---|---|
| 2,310,504 | Aubert | Feb. 9, 1943 |
| 2,419,942 | Brewer | May 6, 1947 |
| 2,604,561 | Simon | July 22, 1952 |
| 2,628,297 | Grauer | Feb. 10, 1953 |
| 2,759,061 | Edeleman | Aug. 14, 1956 |
| 2,772,409 | Reid | Nov. 27, 1956 |
| 2,784,273 | Binford | Mar. 5, 1957 |
| 2,791,657 | Bloxsom et al. | May 7, 1957 |